(12) United States Patent
Hearing et al.

(10) Patent No.: US 7,475,054 B2
(45) Date of Patent: Jan. 6, 2009

(54) INTEGRATING MULTIPLE INFORMATION-PROVIDING SYSTEMS

(75) Inventors: John D. Hearing, Maple Valley, WA (US); Brian J. Smith, Seattle, WA (US)

(73) Assignee: The Boeing Company, Chicago, IL (US)

( * ) Notice: Subject to any disclaimer, the term of this patent is extended or adjusted under 35 U.S.C. 154(b) by 207 days.

(21) Appl. No.: 11/290,156

(22) Filed: Nov. 30, 2005

(65) Prior Publication Data

US 2007/0124266 A1     May 31, 2007

(51) Int. Cl.
*G06F 15/00* (2006.01)
*G06F 15/18* (2006.01)

(52) U.S. Cl. .......................................... 706/62
(58) Field of Classification Search .................. 706/62
See application file for complete search history.

(56) References Cited

U.S. PATENT DOCUMENTS 6,868,525 B1 *   3/2005   Szabo ........................ 715/738
RE39,302 E  *   9/2006   Lanier et al. ................. 706/58
2005/0234929 A1 * 10/2005 Ionescu et al. .............. 707/100

* cited by examiner

*Primary Examiner*—David R Vincent
*Assistant Examiner*—Ben M Rifkin
(74) *Attorney, Agent, or Firm*—Perkins Coie LLP

(57) ABSTRACT

An integrated intelligent environment provides responses to incoming user requests for information. Aspects of the integrated intelligence environment allow information to be efficiently gathered from past solutions, and/or new information to be collected from multiple information sources. The integrated intelligence may include learning agents, mobile objects, and optimizer components that allow for the efficient gathering of information across multiple platforms. The learning agents facilitate providing a response to the user request by determining how similar requests were handled in the past. The mobile objects are configured to seek information from the multiple information sources, and may utilize a publish and subscribe framework. The optimizer determines whether a cost associated with a possible solution justifies use of that solution. A feedback mechanism allows users to rate the provided responses to their requests for information. This rating information may then be utilized in satisfying future requests for information.

29 Claims, 12 Drawing Sheets

FIG. 7

| Consumer | Need | Priority | Utility | ScanEagle | Predator | Video Analysis Team | Rivet Joint | U-2 | ELINT Analysis Team | Imagery Analysis Team | Delta Force | Satellite ELINT |
|---|---|---|---|---|---|---|---|---|---|---|---|---|
| | Presence and location of enemies +/- 100m within 20 km of current location | 3 | 3 | 117 | 152 | 152 | | | | | 147 | |
| Intel Analyst | Parameters of enemy radar at geo location XXX | 2 | 4 | | | | 16 | 127 | 16 | | | 16 |
| AF Targeting Officer | Coordinates of enemy facility +/- 10m | 4 | 5 | 110 | 125 | 125 | | 99 | | 75 | 120 | |
| | Characteristics of buildings (construction, etc.) | 4 | 4 | 110 | 125 | 125 | | 99 | | 75 | 120 | |
| | Graphics of enemy airfields for briefing | 5 | 1 | 121 | 156 | 156 | | 130 | | 106 | 136 | |
| JCB | Status of enemy airfields | 4 | 5 | 106 | 141 | 141 | | 115 | | 91 | | |
| Navy Planner | Locations and parameters of enemy radars at geo location QQQ | 4 | 4 | | | | 8 | 119 | 8 | | | 8 |
| Special Ops | Coordinates of enemy facility +/- 10m | 3 | 5 | 81 | 101 | 101 | | 100 | | 76 | 96 | |
| | Characteristics of buildings (construction, etc.) | 4 | 5 | 81 | 101 | 101 | | 100 | | 76 | 96 | |
| | Enemy activity in the area | 5 | 5 | 111 | 146 | 146 | | | | 96 | 96 | |
| State Department | Status of enemy utilities and infrastructure | 5 | 3 | | | | | 120 | | 96 | 141 | |
| | Location and number of refugees in vicinity | 4 | 4 | 110 | 145 | 145 | | | | | 140 | |
| | | 731 | | | 990 | | 8 | 684 | 8 | | 804 | 16 |

Goal: maximize the number of satisfied users while minimizing the resource cost
9/12 Customer requests satisfied
6/9 Customers satisfied

INTEGRATING MULTIPLE INFORMATION-PROVIDING SYSTEMS

Many agencies and organizations rely on internal and external information systems for their critical and day-to-day operations. For example, various agencies within the U.S. Government rely on various aspects of intelligence, surveillance, and reconnaissance (ISR) systems for acquiring information. Examples of such information include information used or produced by government agencies (e.g., the FBI, CIA, etc.), tactical information used by military commanders, etc.

TECHNICAL FIELD

The present invention relates generally to information systems, such as intelligence systems.

BACKGROUND

Because current ISR systems lack cross-cueing and cross-tasking capabilities and remain largely un-integrated and platform- and agency-centric, sharing assets and information across such systems is often very difficult, resulting in unsatisfied users, excess cost, and duplication of effort. For example, current mechanisms for task creation/distribution, information collection, information exploitation, and information dissemination tend to be organized around specific platforms, intelligence organizations, and intelligence disciplines (e.g., IMINT, COMINT, ELINT, MASINT, etc.). In addition, current optimization schemes for ISR systems tend to result in optimization only at the discipline or agency level. For example, task creation/distribution typically remains a binary choice where a task/problem is assigned to an intelligence discipline without regard to other potential intelligence disciplines (or combination of disciplines) that could be employed to more efficiently perform a task or solve a problem.

Current ISR systems also rely heavily on manual processes and, thus, often require involvement of large numbers of experienced intelligence specialists. While these intelligence specialists may have significant intelligence knowledge, they may often lack operational knowledge (e.g., they may lack knowledge about what a user or requester actually needs or why the user or requestor is making a request).

SUMMARY

The following summary is provided for the benefit of the reader only, and is not intended to limit in any way the invention as set forth by the claims. Aspects of an integrated intelligence environment are described herein. Embodiments of the integrated intelligence environment may be used in commercial operations, governmental operations, civic operations, scientific operations, military operations, etc. Some embodiments of the integrated intelligence environment may handle requests for information submitted by users (e.g., military and national security customers) or other requestors in a way that allows resources and assets across multiple systems to be utilized effectively and efficiently, minimizes operator expertise requirements, and provides fast and effective solutions.

The integrated intelligence environment may employ smart information technologies, such as learning agent technology that helps users with minimal expertise (e.g., intelligence gathering experience) to fine-tune requests for information; mobile object technology that can be custom-configured to retrieve information across multiple systems; optimization algorithms that solve information requests using a solution framework based on knowledge chains (each comprising a flexible combination of information assets/resources) assembled from one or more locations, groups, or systems that can be tasked individually; etc. In addition, some embodiments of the integrated intelligence environment include feedback capabilities (e.g., user feedback loops) and resource tracking capabilities that contribute to optimization and allocation. Resource tracking and feedback loops may also enable system administrators to assess performance of the integrated intelligence environment and the quality of assets available via the integrated intelligence environment.

BRIEF DESCRIPTION OF THE DRAWINGS

FIG. 7 is an information diagram showing examples of user requests for information and related assets in accordance with an optimization scheme.

DETAILED DESCRIPTION

Certain specific details are set forth in the following description and in FIGS. 1-7 to provide a thorough understanding of various embodiments of the invention. Well-known structures, systems and methods often associated with network environments have not been shown or described in detail to avoid unnecessarily obscuring the description of the various embodiments of the invention. Those of ordinary skill in the relevant art will understand that additional embodiments of the present invention may be practiced without several of the details described below.

Many embodiments of the invention described below may take the form of computer-executable instructions, including routines executed by a programmable computer (e.g., a computer-controlled design process). Those skilled in the relevant art will appreciate that the invention can be practiced with other computer system configurations as well. Aspects of embodiments of the invention can be embodied in a special-purpose computer or data processor that is specifically programmed, configured, or constructed to perform one or more of the computer-executable instructions described below. Accordingly, the term "computer" as generally used herein refers to any data processor and includes Internet appliances, hand-held devices (including palm-top computers, wearable computers, cellular or mobile phones, multi-processor systems, processor-based or programmable consumer electronics, network computers, minicomputers and the like).

Aspects of the invention described below may be stored or distributed on computer-readable media, including magnetic and optically readable and removable computer disks, as well as distributed electronically over networks. Data structures and transmissions of data particular to aspects of the invention are also encompassed within the scope of the invention.

Figure 1:
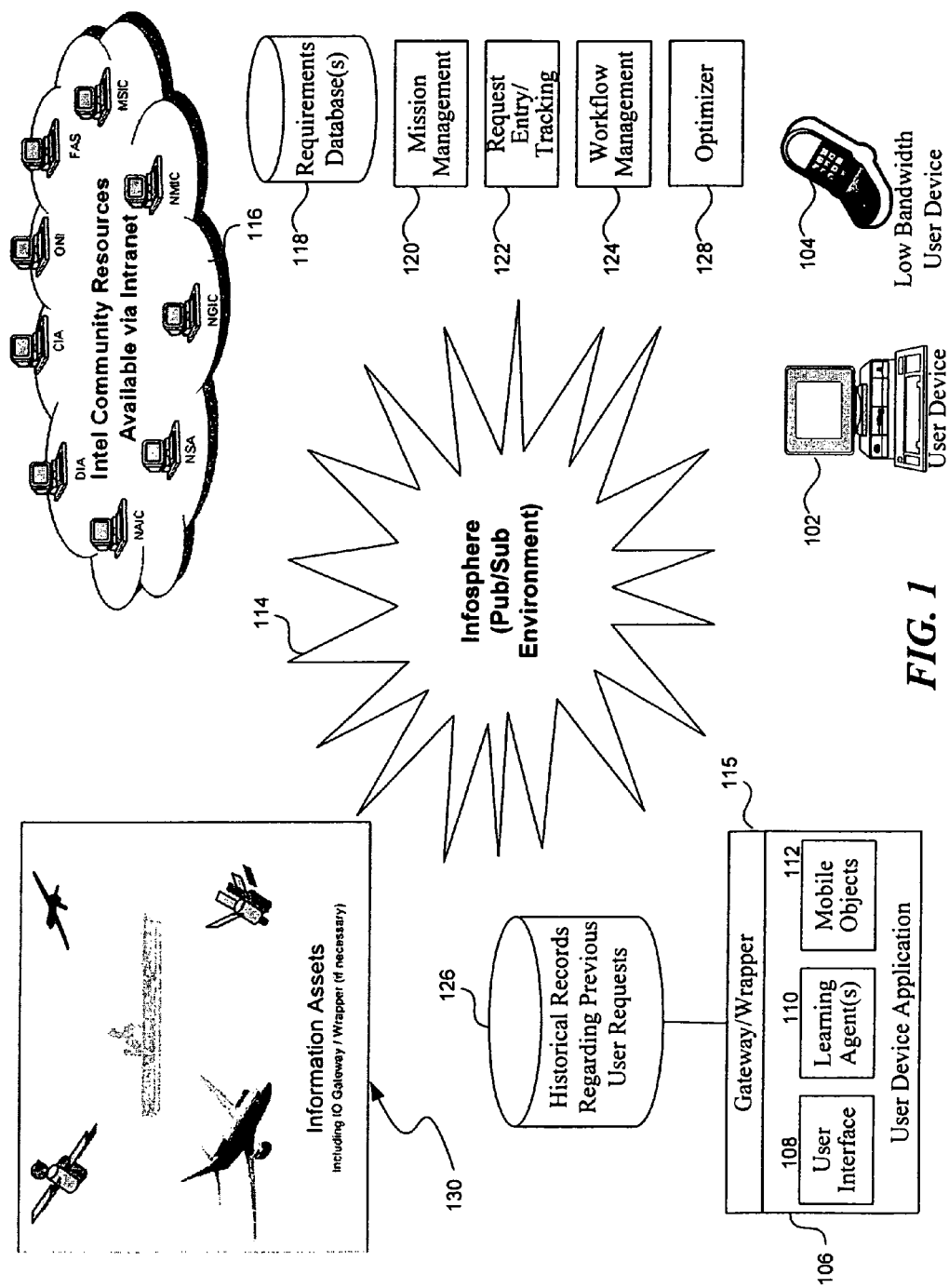
FIG. 1 is a block diagram showing an example of an overview of the integrated intelligence environment in an embodiment of the invention.

FIG. 1 shows an example of components associated with an integrated intelligence environment 100 in an embodiment. The integrated intelligence environment 100 may include one or more user devices, such as a personal computer 102 and a low bandwidth user device 104 (e.g., handheld operating in the field via wireless communications). Users associated with the user devices (102 and 104) may place requests for information from the user devices (102 and 104) via a user interface component 108 of a user device application 106.

The user device application 106 may also include one or more learning agents 110 that facilitate generating the requests for information, as well as collecting user feedback and performing learning activities so that only the most potentially relevant information can be provided to users in addressing future requests for information. For example, such learning agents may comprise software that learns from its user or owner. Once tasks are learned, the learning agent can then instruct or suggest ways to improve. In this way, the learning agents can assist humans (and possibly other systems) in decision-making processes. For example, the one or more learning agents 110 may store associations representing the relationships of items in a specific context. In this way, the one or more learning agents 110 may be able to answer questions such as, "Why did customer X use my ISR collector last week?" and "What combination of ISR assets are best suited to fulfill a user's request for information?" The one or more learning agents 110 may be used to learn from past history (e.g., determine how a response to a current information request may be perceived based on feedback from users receiving responses to similar information requests). Based on this type of learning, the one or more learning agents 110 may propose traditional and non-traditional combinations of assets that have a high probability of producing an intelligence product that is suitable and satisfies the user's request for information. Aspects of the one or more learning agents 110 are described in more detail with respect to FIGS. 5A-5D.

The user device application 106 may further include one or more programmable mobile objects 112 (described in more detail with respect to FIGS. 6A-6C) that can be customized to a particular user request for information and then used to seek and extract information from a community of available assets 130 and/or resources 116. In some embodiments, the one or more mobile objects 112 comprise autonomous programs that carry user-programmed intent and desires used to accomplish tasks. For example, the one or more mobile objects 112 may each employ a type of intelligence model to serve as a basis for its autonomy, and may act as an "automated customer representative," looking for information that may help a user get the knowledge that he or she needs. In some embodiments, a mobile object 112 may migrate from one machine/device to another machine/device within community of available assets 130 and/or resources 116 (preserving its own state so that it can continue where it left off).

In some embodiments, via a publish/subscribe environment 114, the one or more mobile objects 112, via a gateway/wrapper 115 may access aspects of the community of available assets 130 and/or resources 116 to find solutions to user requests. The community of available assets 130 and/or resources 116 may itself comprise components of various autonomous systems (e.g., a "system of systems") that have been configured in accordance with a platform of protocols, processes, and common core services that permit stand-alone or web-based applications to submit, discover, and share information. For example, in a military/defense context, the community of available resources 116 may comprise National Security Agency (NSA) resources, National Ground Intelligence Center (NGIC) resources, National Military Intelligence Collection Center (NMIC) resources, Missile and Space Intelligence Center (MSIC) resources, commercial and public information such as news media, websites such as Federation of American Scientists (FAS), Office of Naval Intelligence (ONI) resources, Central Intelligence Agency (CIA) resources, Defense Intelligence Agency (DIA) resources (e.g., human translators and imagery analysts), National Air Intelligence Center (NAIC) resources (e.g., sensors about aircraft like the U-2 or Rivet Joint), etc. The resources may be implemented using database services, information tools retrieval tools, live information services, satellite services, location identification services, and other assets 130. The gateway 115 provides an interface that allows aspects of legacy systems (e.g., sensors designed and constructed before modern network technology was available) to communicate with other entities in the community of available assets 130 and/or resources 116.

In some embodiments, aspects of the community of available assets 130 and/or resources 116 may be configured in accordance with the publish and subscribe environment 114, which provides reliable and scalable information sharing services. Accordingly, components associated with the community of available assets 130 and/or resources 116 may provide services for publish, subscribe, query, control, etc., using a common data format (e.g., XML) or similar formatted computer message formats. Integration solutions may enable both new and old applications to participate and share information by allowing data to be submitted and routed automatically to any users and applications that need it. For example, integration solutions may employ an extensible Message-Oriented-Middleware framework. Communications via the publish and subscribe framework may be further facilitated via various gateway/wrapper techniques 115 that establish a gateway or wrapper around original input and output interfaces.

While some of the various components described above are described as components of the user device application that access community of available assets 130 and/or resources 116 via publish/subscribe services, other implementations may be possible. For example, rather than residing on a user device application, any one or more of the components involved in handling user requests for information may reside on one or more server computers that provide web-based access to the user devices (102 and 104). Other types of implementations may also be possible (such as distributed environments, where tasks or modules are performed by remote processing devices that are linked through a communications network).

As shown, other components of the integrated intelligence environment 100 may include one or more requirements databases 118, a mission management server 120, a request/entry tracking server 122, a workflow management server 124, etc. These components may include facilities that can be used to track and implement features of the integrated intelligence environment at a system management level (e.g., in contrast to an individual user level).

The integrated intelligence environment 100 may also include a database of historical records 126 that stores information relating to previous requests for information and how they were addressed within the integrated intelligence environment 100, as well as an optimizer component 128 that provides one or more optimization methodologies for assessing the value of a given aspect of the integrated intelligence environment. For example, initially, the one or more learning agents 110 may be used to filter a large list of possible solutions (or knowledge chains) to a reasonable size. The results may then be fed into an optimization algorithm associated with the optimizer component 126 that evaluates the opportunity cost associated with using a given resource or asset in a given situation (e.g., the cost in terms of an opportunity foregone—and the benefits that could be received from that opportunity). In this way, the optimizer component 128 may be used to maximize user satisfaction while minimizing total resources used by the integrated intelligence environment 100. Aspects of the optimizer component 128 are described in more detail with respect to FIG. 7.

Figure 2:
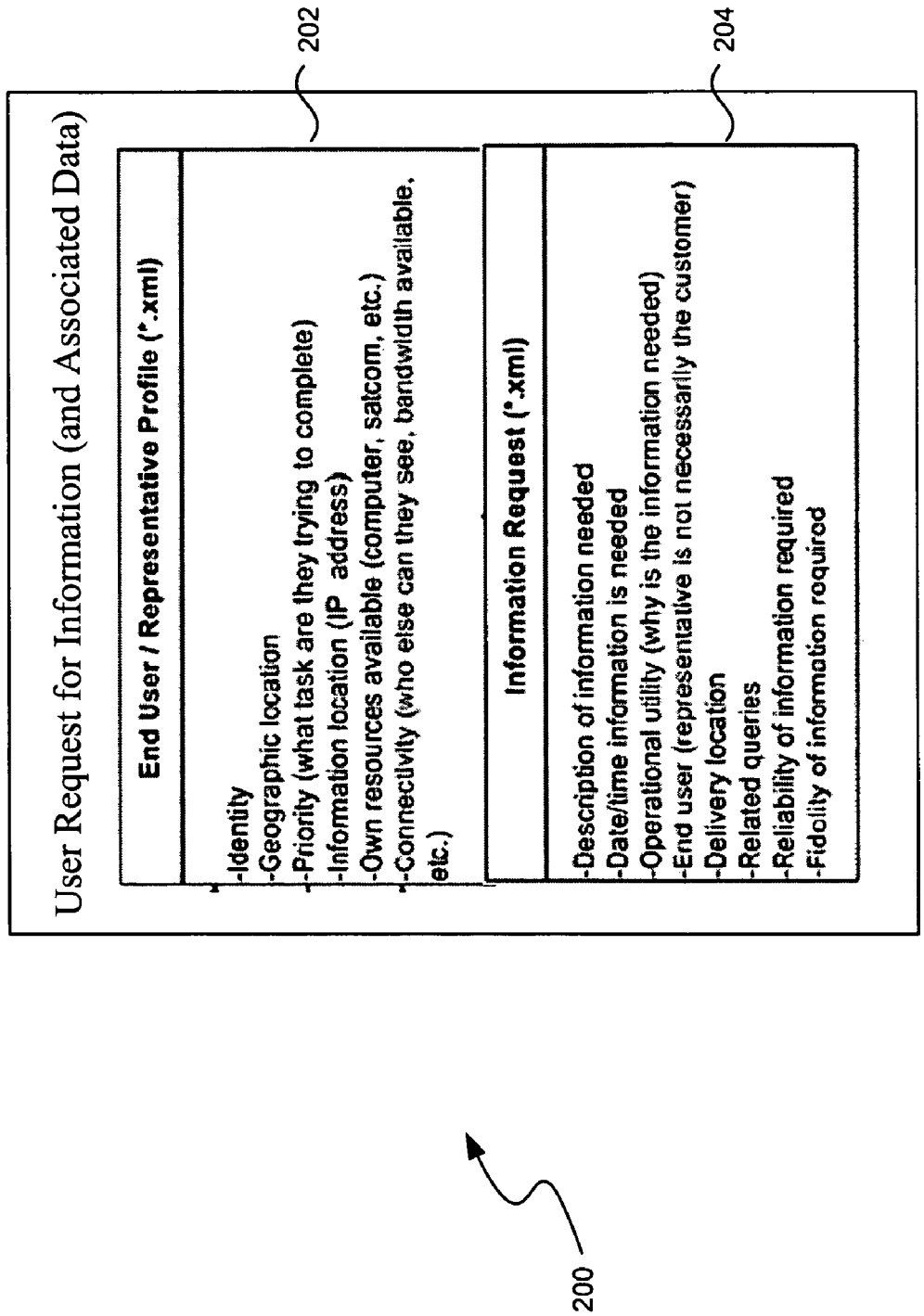
FIG. 2 is a data diagram showing an example of information associated with a user request for information, which may be provided as input to the integrated intelligence environment of FIG. 1.

FIG. 2 is a data diagram showing an example of information associated with a user request for information 200, which may be provided by a user as input to the integrated intelligence environment 100 of FIG. 1. The request for information may include multiple items of information including profile information 202, which relates to a user who is submitting the request, and request information 204. For example, the profile information may include identity information for the user, geographic location information associated with the user, a priority level determined by the user (e.g., relating to what task they are trying to complete), information location (e.g., an IP address), a list of resources available to the user (e.g., computer, satellite access, etc.), connectivity information associated with the user (e.g., available bandwidth, etc.), etc. Besides individual information users, this concept may also be extended to other entities (e.g., intelligence centers, agencies, collection assets, major decision makers, etc.).

The request information 204 may include a description of the information needed, a specified date/time that the information is needed, the utility of the information (e.g., why the user needs the information), an indication of a person who will be an end user of the information (may be different than the requesting user), an indication of the location to where the information should be delivered, an indication of any queries related to the requested information, an indication of how reliable the information needs to be, an indication of fidelity for the information, etc.

In some embodiments, the information associated with the request 200 is received via a user interface (such as the user interface 108 of FIG. 1) and, possibly, via the use of one or more learning agents (such as the learning agents 110 of FIG. 1). In the illustrated embodiment, the request 200 is translated into an XML format, although other formats may be used.

Figure 3:
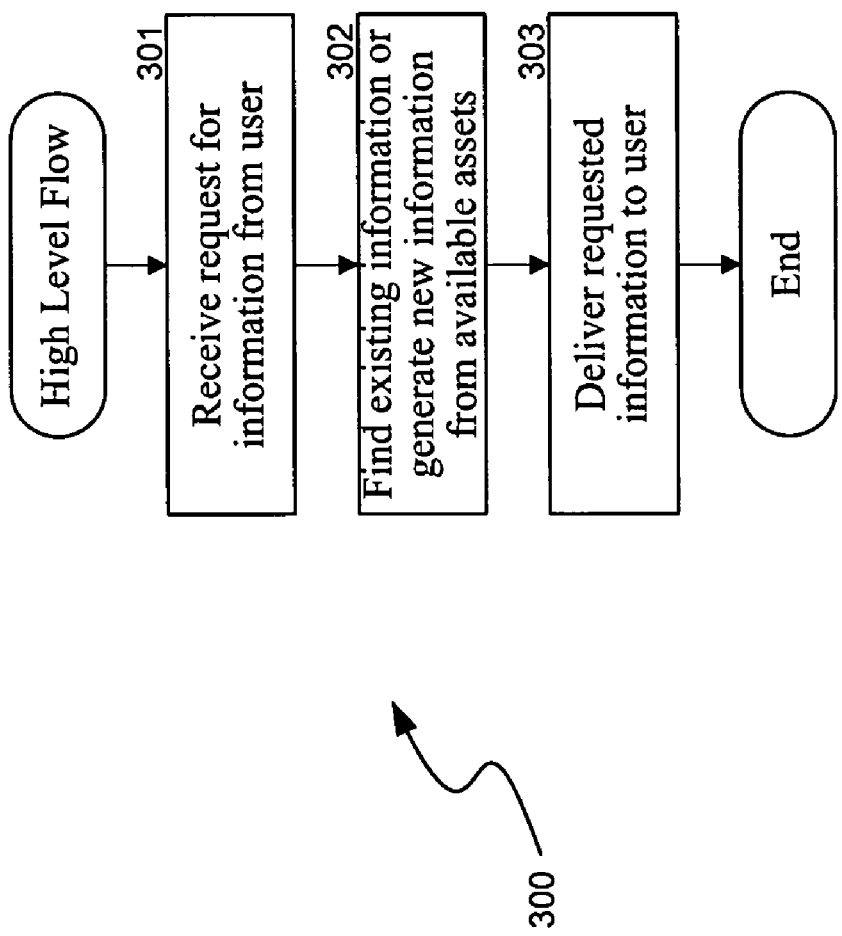
FIG. 3 is a flow diagram showing a high-level process flow associated with the integrated intelligent environment of FIG. 1.

FIG. 3 is a flow diagram showing a high level process flow 300 associated with the integrated intelligence environment of FIG. 1. The high level process flow may be implemented using one or more aspects of the integrated intelligence system. At block 301, aspects of the integrated intelligence system receive a request for information from the user, such as the request 200 depicted in FIG. 2. At block 302, aspects of the integrated intelligence environment find existing information or generate new information from available assets. For example, learning agents and/or mobile objects may determine whether similar requests for information have been placed, and whether solutions to such requests are already available. If no existing solutions are available, the mobile objects (in conjunction with optimization techniques) may seek and find new information from assets available within a community of available assets and/or resources associated with the integrated intelligence system (such as the resources 116 and assets 130 of FIG. 1). At block 303, aspects of the integrated intelligence system deliver requested information to the user.

Figure 4A:
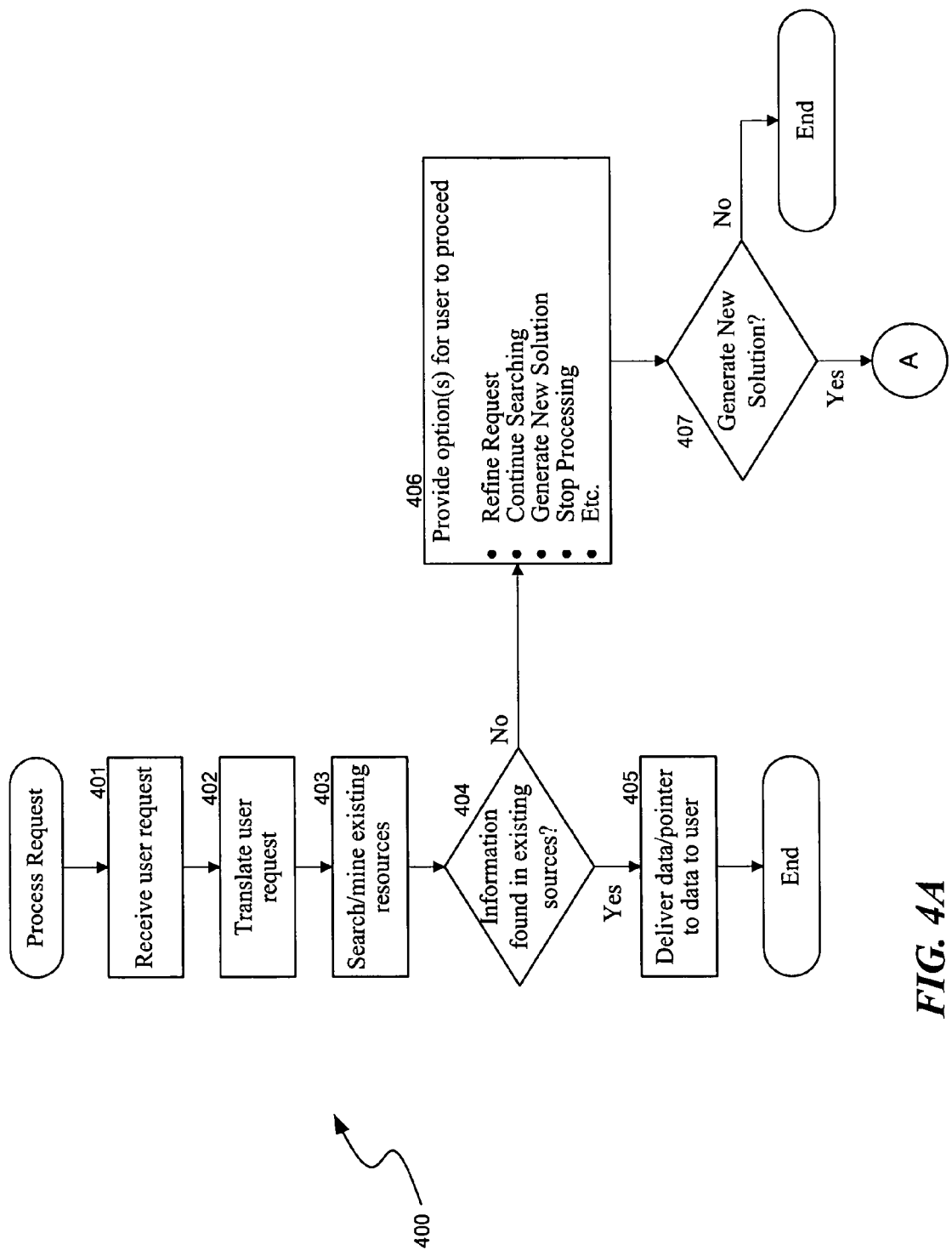
FIGS. 4A and 4B are flow diagrams showing an example of a routine for processing an information request in the integrated intelligence environment, such as the user request for information of FIG. 2.
Figure 4B:
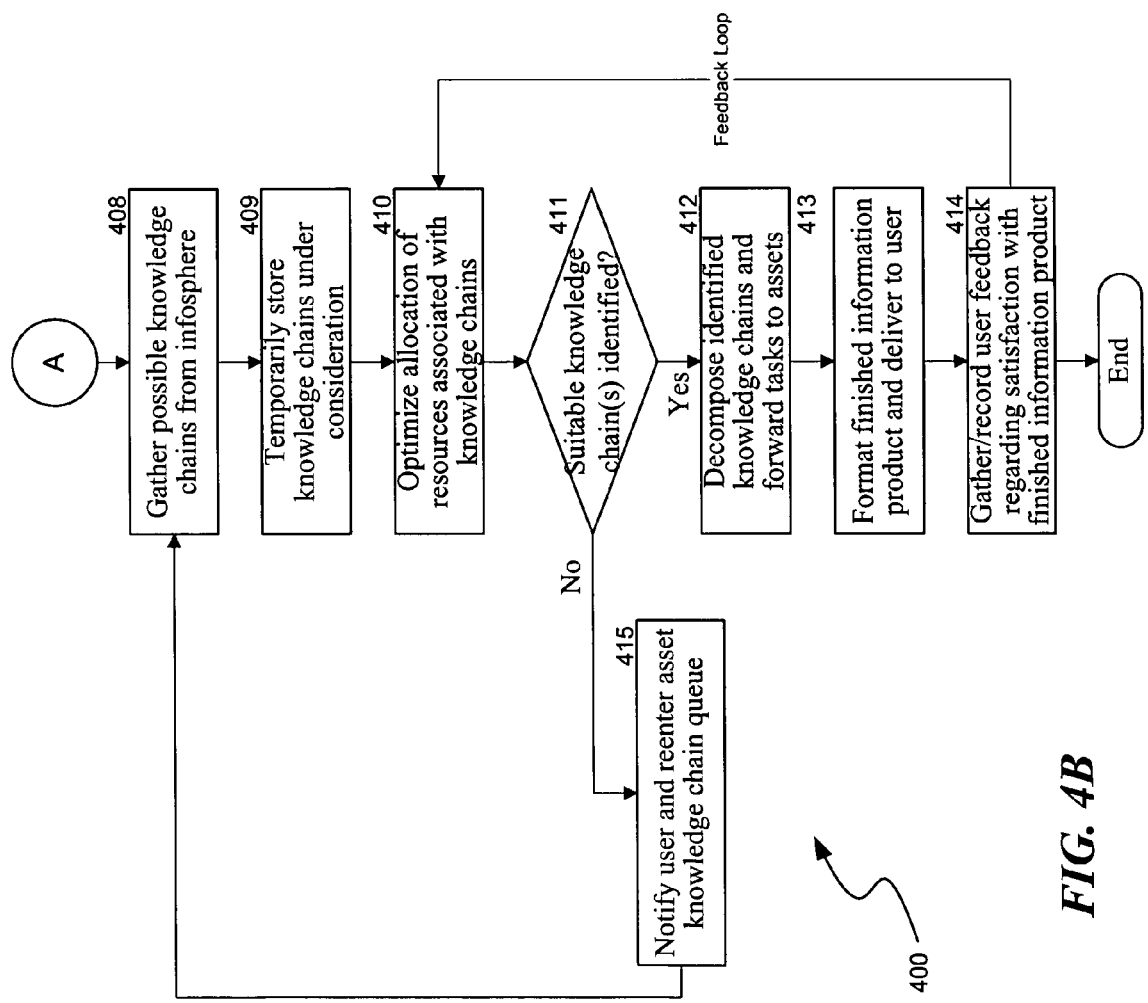

FIGS. 4A and 4B are flow diagrams showing an example of a routine 400 for processing an information request in the integrated intelligence environment, such as the user request for information of FIG. 2. The routine 400 may be performed by several aspects of the integrated intelligence environment, including but not limited to learning agents, mobile objects, and optimization components. At block 401, the routine 400 receives a user request for information (e.g., via a user interface and/or learning agents). This user request may contain detailed information about the nature of the requests, as well as other information (e.g., information about the user, etc.). At block 402, the routine 400 translates the received request into a format (e.g., a standardized format) that relevant aspects of the integrated intelligence environment can handle (e.g., Extensible Markup Language (XML)).

At block 403, the routine 400 causes mobile objects to search/mine existing intelligence resources to determine if a solution already exists in response to the request. For example, the mobile objects may search intelligence products available on a secure intelligence community intranet (e.g., imagery or scientific/technical intelligence studies). The learning agents associated with the routine 400 may search a database of historical records regarding past user requests, such as the database 126 of FIG. 1 to evaluate previous user requests. If, based on an. examination of past requests and their solutions, the routine 400 determines that a solution to the current request already exists (decision block 404), the routine 400 continues at block 405 (where data or a pointer to data is delivered to the user) before ending. If, however, the routine 400 determines that a solution does not currently exist, the routine 400 continues at block 406, and provides one or more options for the user to proceed. For example, the user may have an option to refine the request, continue searching for existing solutions, stop processing, generate a new solution, etc. At decision block 407, if the user has selected an option to generate a new solution, the routine 400 continues as illustrated in FIG. 4B. The other options associated with block 406 are not described in detail, as they could easily be implemented by one skilled in the art.

Referring to FIG. 4B, the routine 400 may proceed with generating a new solution for the user's requests, which can be in the form of a knowledge chain. Accordingly, at block 408, the routine 400 derives possible knowledge chains from an infosphere (e.g., a publish/subscribe environment) containing descriptions of assets that may potentially satisfy/solve the user's request. For example, the learning agents may examine past history to generate a list of one or more information sources from which the information may be gathered. In addition, generating knowledge chains may also involve the use of intelligent processing and querying capabilities. In particular, one or more mobile objects may be sent out within the infosphere to gather relevant information from assets that form such knowledge chains. For example, the mobile objects may gather information about the current availability and/or capability of select assets. In some embodiments, assets may advertise their availability and capability to the mobile objects through a publish and subscribe networking environment.

At block 409, the routine 400 temporarily stores knowledge chains under consideration. At block 410, the routine 400 optimizes allocation of resources associated with knowledge chains, to determine which of the available knowledge chains are most responsive to the request. At decision block 411, if no suitable knowledge chains are identified as optimal, the routine 400 proceeds at block 415, where the routine 400 notifies the user accordingly and further solutions are sought by the learning agents in conjunction with the mobile objects.

If, however, at decision block 411, at least one suitable knowledge chain is identified, the routine 400 continues at block 412 where the routine 400 decomposes the identified knowledge chains and forwards individual tasks to individual assets identified within the knowledge chain, so each asset can perform its respective task in furtherance of a solution that is responsive to the request.

At block 413, the routine 400 formats information returned by each asset to create a finished information product and delivers it to the user. At block 414, a feedback loop is initiated when the routine 400 gathers and records user feedback regarding the user's satisfaction with the finished information product. In some embodiments, this information may then be used as part of optimization (e.g., block 410).

Figure 5A:
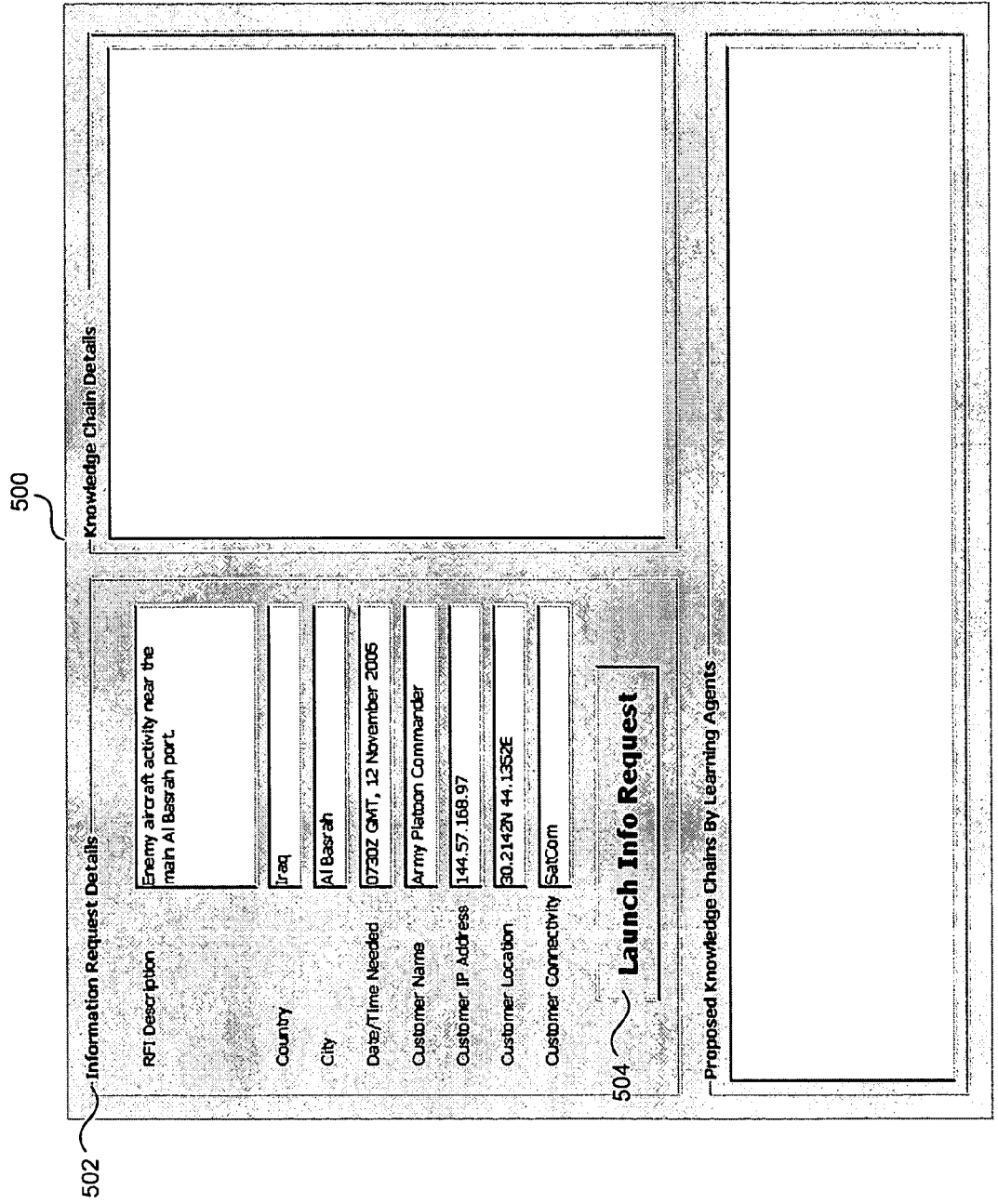
FIGS. 5A-5D are display diagrams showing sample user interface features associated with a learning agent of the integrated intelligence environment of FIG. 1.
Figure 5B:
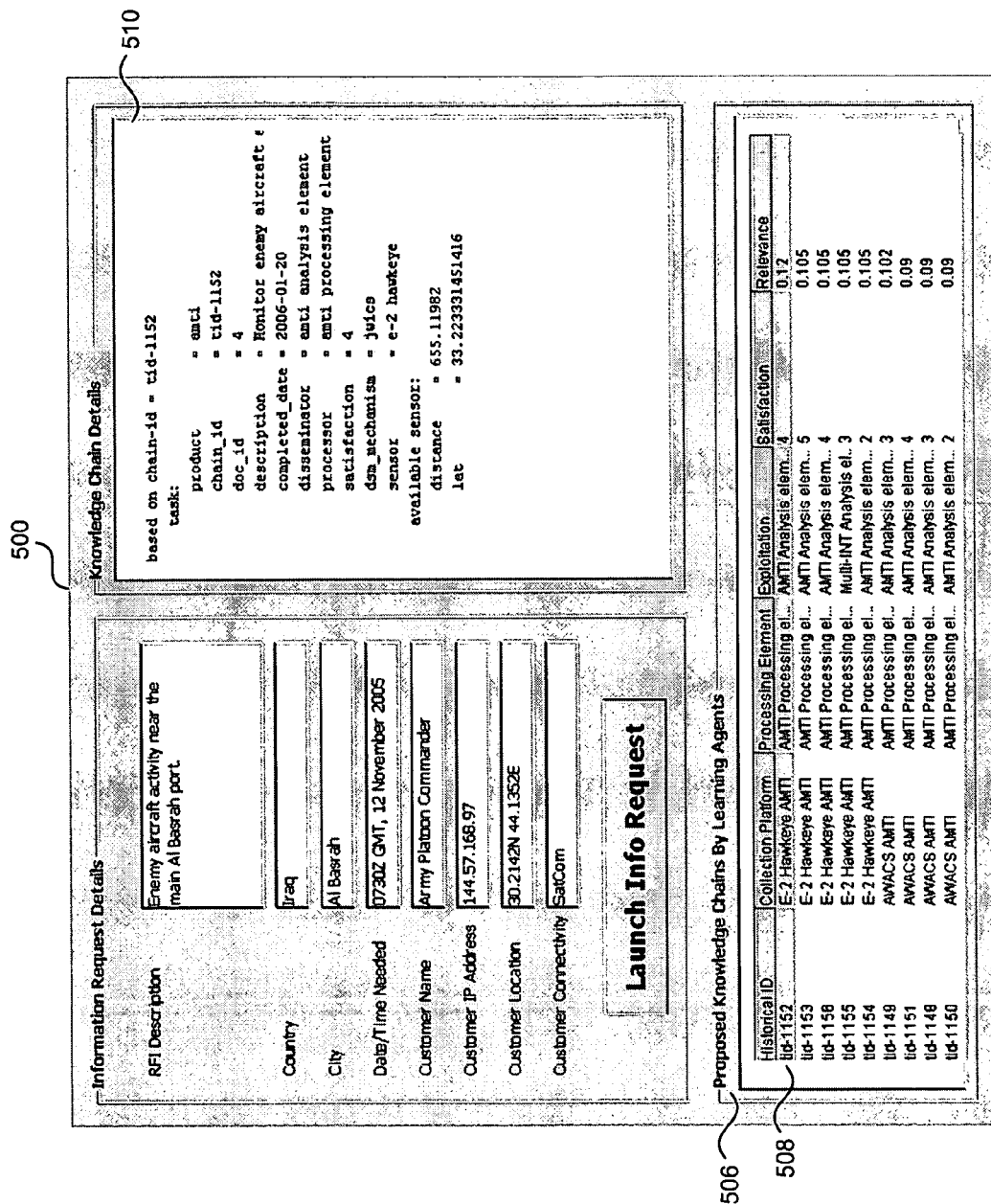
Figure 5C:
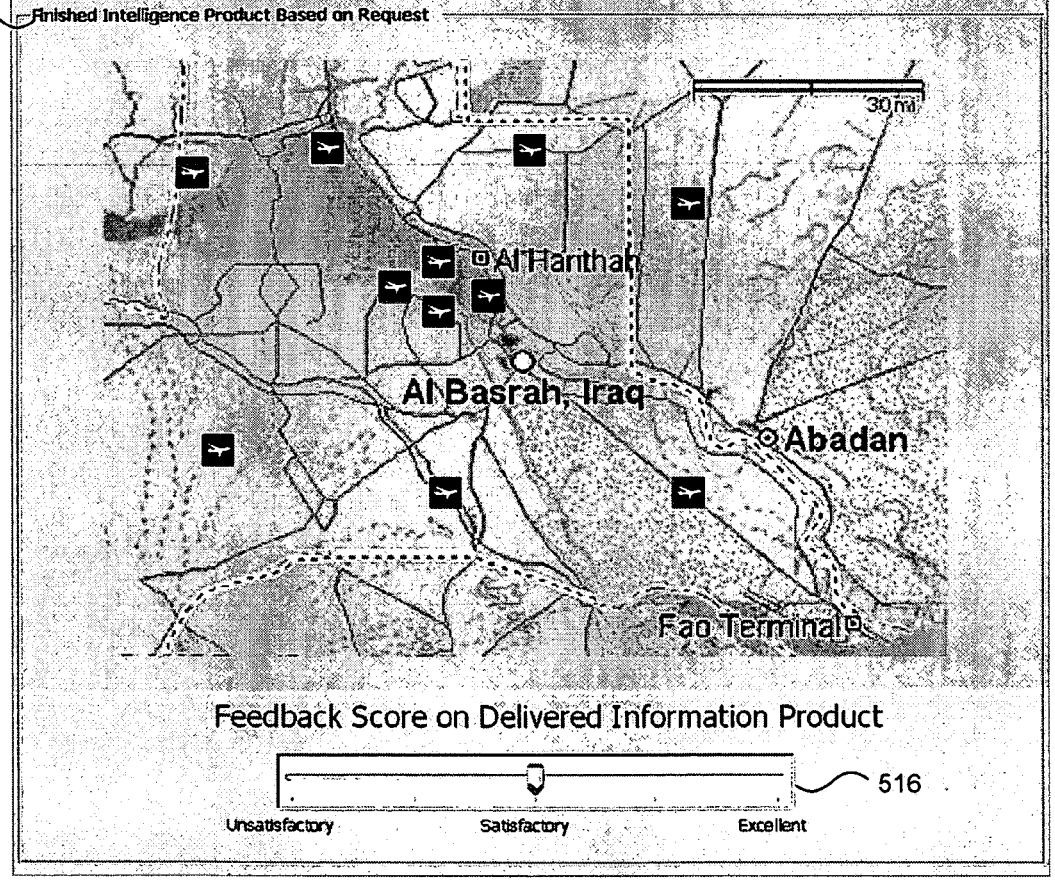
Figure 5D:
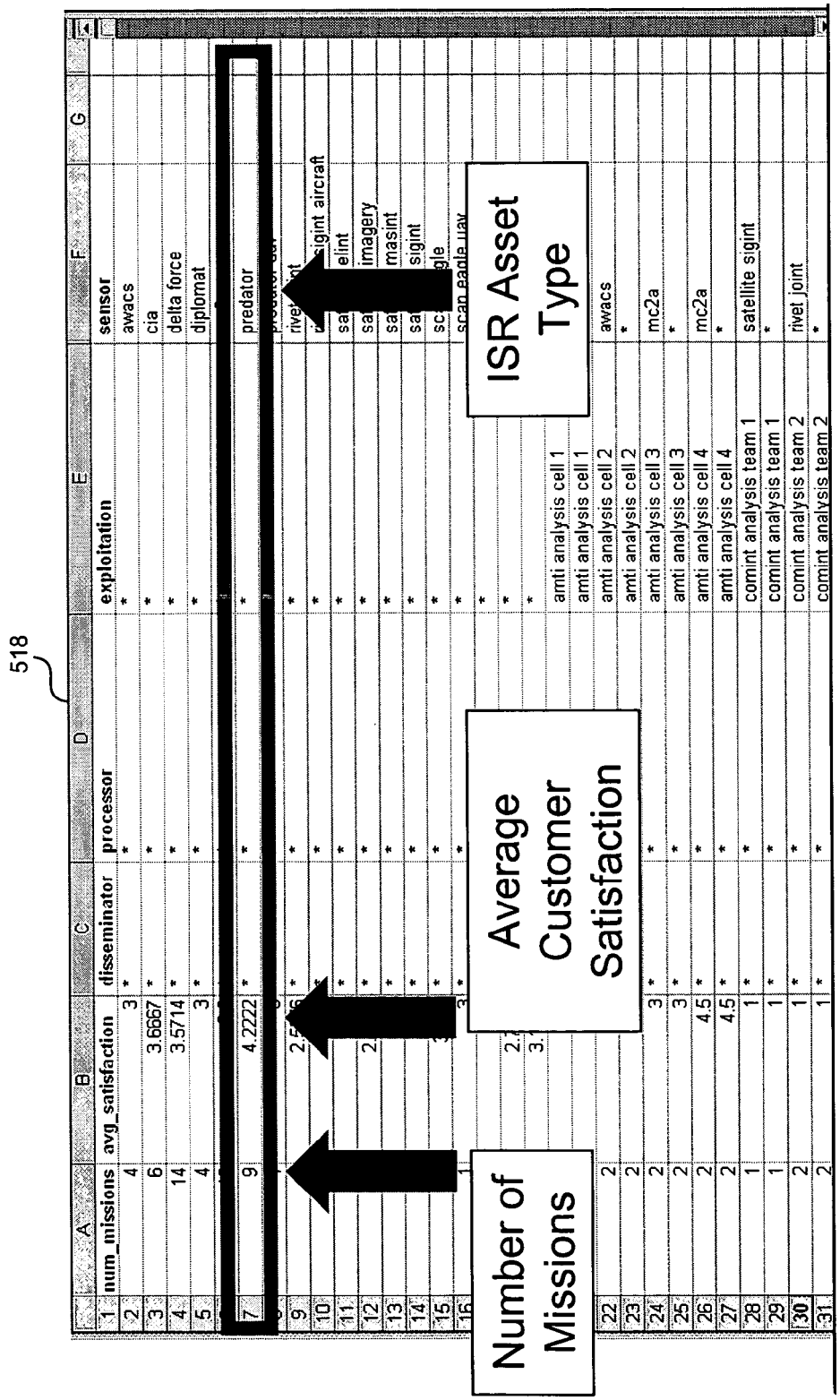

FIGS. 5A-5D are display diagrams showing example user interface features and functionality associated with a learning agent of the integrated intelligence environment. In particular, FIGS. 5A-5C show aspects of a screen or view 500 where information may be exchanged between a user and the learning agent. FIG. 5A highlights an Information Request Details area 502 in which a user may describe his or her request. In the illustrated example, the request relates to identifying enemy aircraft in a specified region. After filling in the appropriate information in the Information Request Details area 502, the user may execute the request by selecting a Launch Info Request button 504. The results of launching this request are shown in FIGS. 5B-5D.

Figure 6A:
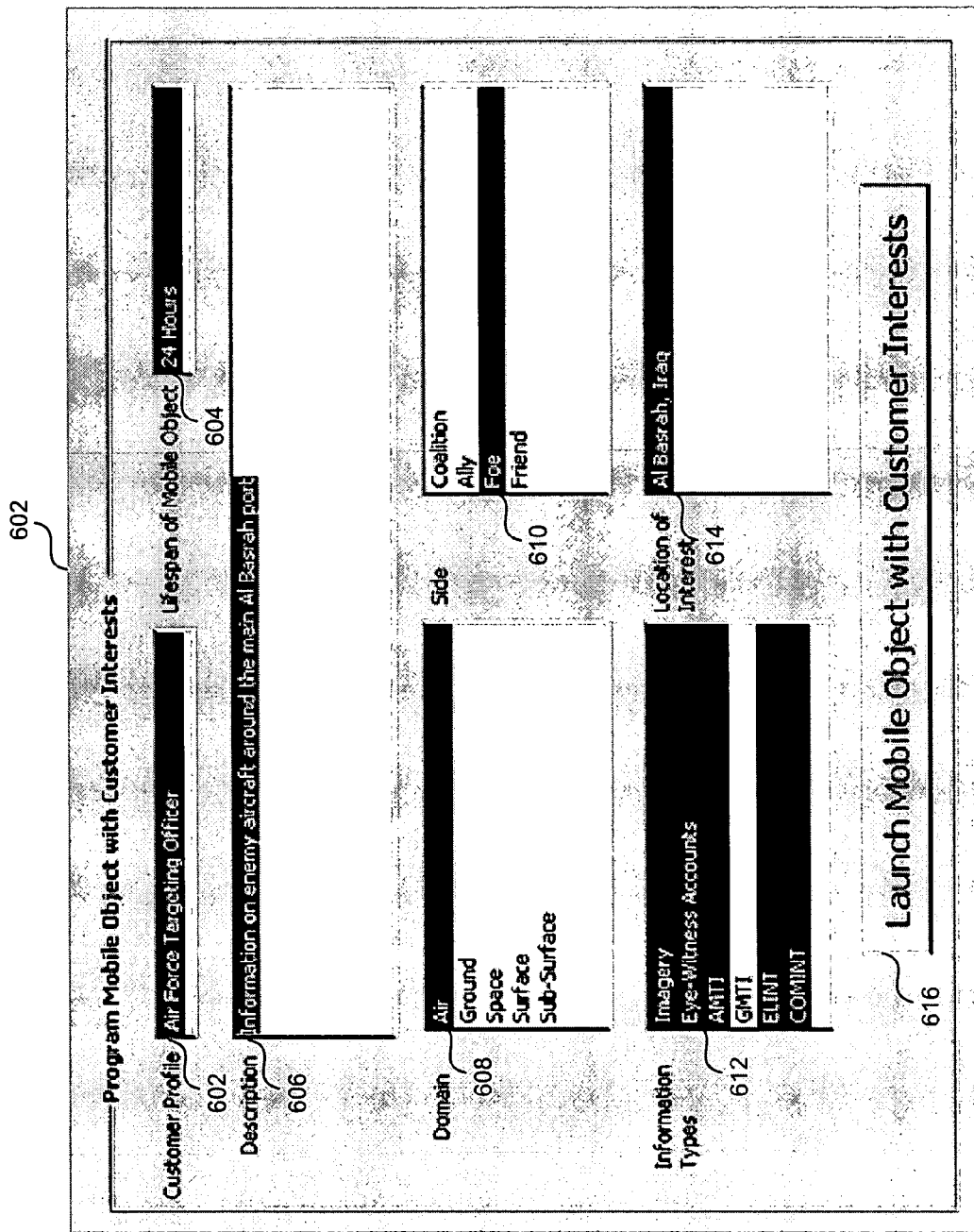
FIGS. 6A-6B are display diagrams showing sample user interface features associated with a customized mobile object of the integrated intelligence environment of FIG. 1.
Figure 6B:

FIG. 5B highlights a proposed knowledge chain area 506, where the learning agent provides a listing of possible available knowledge chains (e.g., as collected by one or more mobile objects—described in more detail with respect to FIGS. 6A-6C) that, based on feedback from past information requests, may have a probability of satisfying the user's request. As soon as it becomes available, aspects of a selected solution 508 may be displayed in a chain details area 510. In addition, FIG. 5C highlights aspects of a completed learning agent request, including an area displaying Chosen Knowledge Chain Details 512, an area showing a Finished Intelligence Product Based on Request 514, and a negative/positive feedback tool 516 that allows the user to submit feedback relating to how successful the user found the provided solution to his or her request. FIG. 5D illustrates a set of user feedback information 518 as collected by the learning agent. This information may be used, for example, by optimization algorithms, as described with respect to FIGS. 4B and 7. In this way, feedback can be used to determine how to best to solve future requests.

FIGS. 6A-6B are display diagrams showing sample user interface features associated with a customized mobile object of the integrated intelligence environment of FIG. 1. For example, the mobile object may be a programmed software object that is configured to be sent out to retrieve information from remote systems (e.g., through the use of queries and other information retrieval means). The information retrieved by the customized mobile object may include data from databases, information in HTML form (e.g., from web pages), information in XML form, text information (e.g., a document prepared by a human), video information, graphical information, audio information, or any other type of information available via the infosphere. As shown in FIG. 6A, in some embodiments, a mobile object may be configured (either automatically or at least partially by a user) to seek assets/resources within the infosphere for building knowledge chains. This may be done by building specifying various fields of information (e.g., Customer Profile 602, Lifespan of Mobile Object 604, Description 606, Domain 608, Side 610, Information Types 612, Location of Interest 614, etc.) to build a query or by other means. These various fields of information may vary depending on the customer profile or other factors, and may be customized to best meet customer needs. After specifying the various fields of information, the user may launch the mobile object by selecting a Launch mobile Object button 616. As shown in FIG. 6B, the mobile object may autonomously search for information of interest to its owner, either notifying the owner that the information does not exist or delivering the information, such as in query results 618. Where possible, the mobile object may automatically display retrieved information 620 (e.g., information from the Federation of American Scientists Internet site).

FIG. 7 is an information diagram showing examples of user requests for information and multiple information asset options for each, in accordance with an optimization scheme. The diagram (which is intended for illustrative purposes only) shows various types of information that may be provided as input with respect to an optimization algorithm. For example, this input information may include customer information 702, which indicates the source of the request; need information 704, which provides an indication of what the requested information is needed for (for example, an Army Battalion Commander wants to know the presence and location of enemies within 100 meters of their current location); priority information 706, which provides, for example, a numerical value indicating priority (e.g., urgent, semi-urgent, not urgent, etc.); utility information 707, which provides an indication of the importance of the requested information in the context of mission needs) and a listing of several potential information assets 708 (e.g., ScanEagle, Predator, Video Analysis Team, Rivet Joint, U-2, ELINT Analysis Team, Imagery Analysis Team, Delta Force, Satellite ELINT, etc.)

During collection of knowledge chain information (as shown for example, in block 408 of FIG. 4B), information about the availability and capability of potential assets is collected (e.g., by mobile agents). The optimization scheme may the use this information to select a "best" solution from among one or more options, or at least select a solution that has some probability of satisfying the user's request for information. For example, the available assets in the Army Battalion Commander's area of interest include a ScanEagle UAV, a Predator UAV, an Army Delta Force platoon, and a Video Analysis Team (as indicated by the numerical values presented in row 710). Examples of capabilities for the assets provided in the example of Army Battalion Commander include sensors onboard, mission availability, geographic location, processing capabilities, bandwidth availability, etc. Other examples (not shown here) included radar transmitter, receiver, fire control, launchers, weapons, etc. Separating previously integrated platforms into individually addressable assets and capabilities (each possibly assigned its own unique IP address) allows for a mix-and-match of capabilities across multiple systems and gains substantial efficiency compared to the current ISR systems.

Based on the availability and capability information, and on feedback obtained by providing solutions to requests for information in the past, an intelligent software agent (or the like) may propose a list of possible combinations of assets that could possibly solve the customer's information request. In some embodiments, these knowledge chains are proposed using historical records of how well similar information requests were answered using specific assets and the associated satisfaction of the customers. For example, the Army Battalion Commander's request for information could be addressed in the following ways:

Proposed Knowledge Chain #1 (Estimated Probability of meeting customer's needs is 0.8): ScanEagle UAV takes a video→ video is processed by Video Analysis team and target coordinates are derived.

Proposed Knowledge Chain #2 (Estimated Probability of meeting customer's needs is 0.74): Predator UAV takes a video→ video is processed by Video Analysis team and target coordinates are derived.

Proposed Knowledge Chain #3 (Estimated Probability of meeting customer's needs is 0.65): Delta Force platoon does reconnaissance of area→ Delta Force platoon derives target coordinates.

The numerical values under the various assets may indicate the "opportunity cost" of using an asset/resource, which may be a value based on the timeliness of the need, availability of mechanisms to collect, process and exploit information associated with the asset, demand on the asset from other users, and any perturbations that assigning this asset may cause. The result may be a near real-time optimization that can be used across the integrated intelligence environment to assign assets in a way that maximizes customer satisfaction while minimizing total system resources used, provides improved overall customer satisfaction, provides timely solutions, etc. In this example, the Army Battalion Commander's request 710 is one of three requests that have yet to be completed (along with request 716 and 724) because the opportunity costs involved are too high relative to the priority and utility factors. Accordingly, these requests may need to be resubmitted. In contrast, requests 712, 714, 718, 720, 722, and 726 have been addressed (as shown by the highlighted opportunity cost factors in their respective columns).

From the foregoing, it will be appreciated that specific embodiments of the invention have been described herein for purposes of illustration, but that various modifications may be made without deviating from the spirit and scope of the invention and aspects of the invention described in the context of particular embodiments may be combined or eliminated in other embodiments. For example, while certain embodiments describe the use of sensor networks operating in a military environment, the invention may be implemented in the context of other environments where a need for surveillance is established.

Although advantages associated with certain embodiments of the invention have been described in the context of those embodiments, other embodiments may also exhibit such advantages. Additionally, none of the foregoing embodiments need necessarily exhibit such advantages to fall within the scope of the invention. Accordingly, the invention is not limited except as by the appended claims.

We claim:

1. In a computerized system, a method for responding to a user request for information, the method comprising:
   receiving a request for intelligence, surveillance, and reconnaissance (ISR) information from a user;
   generating a solution for the received request, wherein the generating includes:
   automatically examining a collection of past requests and associated past solutions to determine whether a suitable solution to the received request already exists;
   if a suitable solution to the received request does not already exist, automatically determining a current or near current availability and/or capability of individual ISR field assets for use in generating the solution, including receiving information from one or more autonomous military intelligence systems from a collective of intelligence systems including information derived from at least one of: military surveillance, military reconnaissance, or a military sensor; and
   automatically selecting a suitable set of ISR field assets for use in generating the solution, wherein the selecting is based, at least in part, on determining the current or near current availability and/or capability of the individual information assets.

2. The method of claim 1 further comprising:
   formatting the received request for ISR information into a standardized format based on Extensible Markup Language (XML), wherein the received request for ISR information comprises a request data structure including both user profile information and request information;
   applying an optimization scheme to information associated with the at least one set of ISR field assets, wherein the optimization scheme is based on perceived relative demand on an ISR field asset by other potential users, assigning a cost value to each ISR field asset from the one or more sets of ISR field assets, and determining which set of ISR field assets has the lowest total costs, wherein the optimization scheme further includes considering a priority and a utility of the request for information relative to one or more other pending requests for information;
   forwarding requests for individual tasks to be completed by ISR field assets associated with the selected set of ISR field assets, so each ISR field asset can perform its respective task in furtherance of a solution that is responsive to the request for ISR information;
   delivering an information product to the user, wherein the information product is based on the selected set of ISR field assets; and
   receiving feedback on how satisfied the user is with the delivered information product.

3. The method of claim 1 wherein the received request for ISR information comprises a request data structure including both user profile information and request information, and wherein the user profile information includes an indication of user location information and resources available to the user.

4. The method of claim 1 further comprising formatting the ISR information request into a standardized format based on Extensible Markup Language (XML) or an XML type format.

5. The method of claim 1 wherein determining the current or near current availability and/or capability of individual ISR field assets is performed, at least in part, using a publish and subscribe framework over which the components advertise their availability and/or capabilities.

6. The method of claim 1 wherein the selecting occurs after applying an optimization scheme to information associated with the at least one set of ISR field assets, wherein the optimization scheme includes assigning a cost value to each ISR field asset from the one or more set of ISR field assets based on perceived relative demand on that asset by other potential users and determining which of the set of ISR field assets has the lowest total costs, wherein the optimization scheme further includes considering a priority and a utility of the request for ISR information relative to one or more other pending requests for ISR information.

7. The method of claim 1 further comprising:
   delivering an information product to the user, wherein the information product is based on the selected set of ISR field assets; and
   receiving feedback on how satisfied the user is with the delivered information product.

8. The method of claim 1 further comprising:
forwarding requests for individual tasks to be completed by ISR field assets associated with the selected set of ISR field assets, so each ISR field asset can perform its respective task in furtherance of a solution that is responsive to the request for ISR information.

9. The method of claim 1 wherein each of the past solutions can be separated into one or more individual ISR field assets, wherein each of the individual ISR field assets is associated with at least one autonomous system from a collective of intelligence systems; and
wherein generating a solution for the received request also includes automatically identifying, from the collection of past solutions, at least one set of ISR field assets that may possibly be used to generate the new solution.

10. The method of claim 1 wherein the information product is delivered to a limited bandwidth device.

11. An integrated information retrieval system comprising:
a processor; and
a memory comprising instructions for components, the components comprising:
 a learning agent configured to receive, from a user, a request for intelligence, surveillance, and reconnaissance(ISR) information and seek possible solutions for the request for information, wherein each of the solutions is comprised of information provided by at least one ISR field resource, wherein an ISR field resource derives information from military surveillance, military reconnaissance, a military intelligence collection system, or a military sensor;
 a programmable mobile object configured to query the at least one ISR field resource for current information about its availability, wherein the at least one ISR field resource is a component of at least one intelligence system from a collective of autonomous intelligence systems, and wherein aspects of the programmable mobile object and the learning agent are accessible via an application running at a user device; and
 a records database containing information associated with past user requests and associated solutions, wherein the learning agent seeks possible solutions from the request for information based, at least in part, on the information in the records database.

12. The system of claim 11
wherein the mobile object is programmable by a user and communicates with the at least one ISR field resource using a publish and subscribed network environment; and
wherein the learning agent is further configured to display suggested possible solutions to the user, to solicit and accept user feedback regarding whether one or more solutions provided to the user satisfy the request for ISR information.

13. The system of claim 11 further comprising
setting an opportunity cost value associated with the at least one ISR field resource.

14. The system of claim 11 wherein the mobile object and the learning agent reside, at least partially, on an application running at a user device.

15. The system of claim 11 wherein the mobile object and the learning agent reside, at least partially on a server system.

16. The system of claim 11 wherein the learning agent is further configured to suggest and display suggested possible knowledge changes to the user.

17. The system of claim 11 wherein the learning agent is further configured to (1) solicit, accept, and store user feedback regarding whether one or more solutions provided to the user satisfy the request for ISR information, (2) store information relating to the request for ISR information, and (3) store information relating to a set of ISR field resources selected to satisfy the request for ISR information.

18. The system of claim 11 wherein the mobile object and the learning agent reside, at least partially, on an application running at a user device and wherein the user device is a limited bandwidth user device.

19. A computer implemented method for responding to requests for intelligence, surveillance, and reconnaissance (ISR) information based on information provided in an integrated intelligence environment comprising multiple autonomous information sources, the method comprising:
receiving a request for information;
collecting information in response to the request for information, wherein the collected information originates from one or more of the multiple autonomous information sources, and wherein the collected information includes at least one proposed knowledge chain that employs information from one or more ISR field assets wherein the collecting includes an ISR field asset receiving information from at least one of: military surveillance, military reconnaissance, a military intelligence collection system, or a military sensor;
applying an optimization scheme to the collected information to determine a suitable solution for the request, wherein applying the optimization scheme includes assessing costs of utilizing individual ISR field assets from the at least one proposed knowledge chain; and
providing results associated with the suitable solution to an end user.

20. The method of claim 19
wherein applying the optimization scheme further includes assessing bandwidth capabilities associated with utilizing the individual ISR field assets, assessing distribution of workload across the integrated intelligence information environment, assessing a priority value associated with the request for ISR information relative to priority values for other pending requests for ISR information, and assessing a utility value associated with the request for ISR information relative to utility values for other pending requests for ISR information; and
wherein the method further comprises:
 receiving feedback from the end user regarding whether the end user is satisfied with the provided information; and
 utilizing the received feedback in collecting information for responding to subsequent requests for ISR information.

21. The method of claim 19 wherein applying the optimization scheme further includes assessing bandwidth capabilities associated with utilizing the individual ISR field assets.

22. The method of claim 19 further comprising:
receiving feedback from the end user regarding whether the end user is satisfied with the provided information; and
utilizing the received feedback in collecting information for responding to subsequent requests for ISR information.

23. The method of claim 19 wherein applying the optimization scheme further includes assessing processing capability limits associated with utilizing the individual ISR field assets.

24. The method of claim 19 wherein applying the optimization scheme further includes assessing distribution of workload across the integrated intelligence information environment.

25. The method of claim 19 wherein applying the optimization scheme further includes assessing a priority value associated with the request for ISR information relative to priority values for other pending requests for ISR information.

26. The method of claim 19 wherein applying the optimization scheme further includes assessing a utility value associated with the request for ISR information relative to utility values for other pending requests for ISR information.

27. In a method in a computer for providing intelligence, surveillance, and reconnaissance (ISR) information, the method comprising:

generating a request for ISR information based, at least in part, on receiving input from a user;

analyzing the received request to identify a possible solution, wherein identifying the possible solution includes identifying multiple information sources of possible solutions;

using a mobile agent program to retrieve information from the multiple information sources to create an integrated response comprising the possible solution, wherein the retrieving includes determining a current or near current availability and/or capability of individual ISR field assets, including receiving information provided by one or more autonomous systems from a collective of intelligence systems and selecting a suitable set of ISR field assets based, at least in part, on determining the current or near current availability and/or capability of the individual ISR field assets and using the selected ISR field assets to retrieve information from one or more of: military surveillance, military reconnaissance, a military intelligence collection system, or a military sensor; and presenting the integrated response comprising the possible solution to the user.

28. The method of claim 11 wherein the military sensor is configured for use with an aircraft.

29. The method of claim 11 wherein the military sensor is configured for use with a satellite.

\* \* \* \* \*